Figure 1:
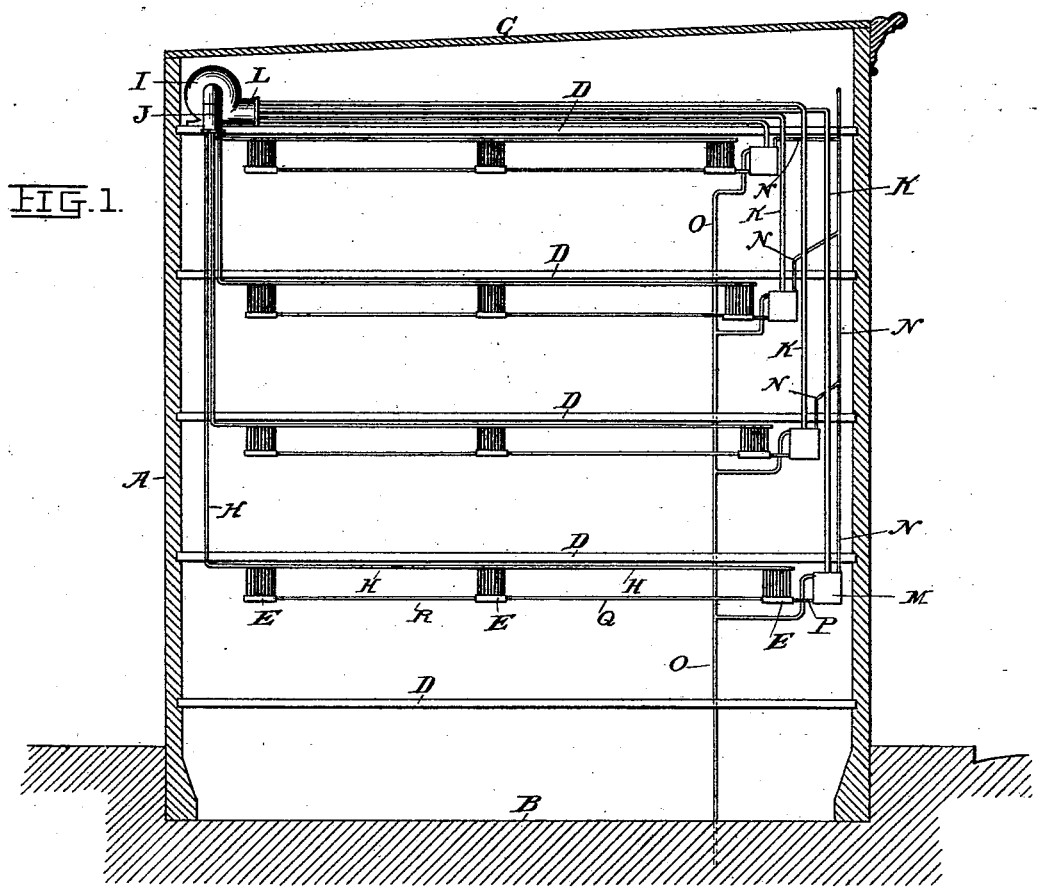

(No Model.)

M. WANNER.
REFRIGERATING APPARATUS.

No. 500,088. Patented June 20, 1893.

WITNESSES:
Edward C. Rowland
John C. Lacey

INVENTOR
Martin Wanner
BY Phillips Abbott
ATTORNEY

UNITED STATES PATENT OFFICE.

MARTIN WANNER, OF DENVER, COLORADO, ASSIGNOR OF ELEVEN-TWENTIETHS TO WILLIAM B. CRITTENDEN AND JOHN M. MILLMAN, OF SAME PLACE.

REFRIGERATING APPARATUS.

SPECIFICATION forming part of Letters Patent No. 500,088, dated June 20, 1893.

Application filed December 8, 1892. Serial No. 454,459. (No model.)

*To all whom it may concern:*

Be it known that I, MARTIN WANNER, a citizen of the United States, and a resident of Denver, in the county of Arapahoe and State of Colorado, have invented certain new and useful Improvements in Refrigerating Apparatus, of which the following is a specification.

My invention relates to improvements in refrigerating apparatus by which the process may be practiced, and it has special application to the refrigeration of cold warehouses and the refrigerator compartments in vessels, abattoirs, breweries and the like places; it is also applicable to the manufacture of artificial ice, as will be hereinafter described.

In my apparatus I employ carbon bi-sulphide in somewhat the same manner that ammonia is now used, with however certain important differences, whereby I secure marked advantages, some of which are as follows: In the use of aqua ammonia the original cost of the apparatus is so great as, practically to preclude its use, excepting under unusually favorable conditions. Consequently in the large majority of refrigerating plants now in operation, the an-hydrous ammonia is employed, in the use of which, however, there are also very grave objections; among them is the first cost of the plant, the same as in the case of the aqua ammonia, and in addition to this the great difficulty of confining the an-hydrous ammonia during transportation and during use in the plant; the cost of the an-hydrous ammonia itself, the cost of the tanks to contain it in transportation, the transportation charges owing to the weight of the tanks, the liability to accident consequent upon bursting of the tanks; the very heavy repair account of the plant, resulting from the necessity for confining the material under heavy pressure and also the expense in addition to those already suggested necessitated by the re-compression of the an-hydrous ammonia for re-use.

By the employment of my peculiar process and apparatus, I overcome many of the objections recited above altogether, and others I measurably reduce; and my apparatus is so constructed that after it is once set up and charged, its running expenses are very small, all that is required being sufficient power to run an exhaust pan or pump and the cost of a small percentage of the material carbon bisulphide, which may become lost through wastage.

Generally stated, my invention is as follows: I employ as the refrigerating medium carbon bi-sulphide, and it is owing to the peculiar properties of this very volatile substance that I am enabled to employ my apparatus, whereby I secure the results above suggested and the advantages claimed. These properties are as follows:—first, its volatility combined with its low "critical" pressure, *i. e.*, the pressure at which it will re-liquefy after having been in a condition of vapor, in other words, evaporated; this pressure, in the case of the carbon bi-sulphide, being only about fifteen pounds to the square inch, *i. e.* about atmospheric pressure compared to a pressure of one hundred and twenty pounds to the square inch necessary for reliquefaction of an-hydrous ammonia. Other advantages, *i. e*, the cheapness of the plant, low running expenses, &c., I secure by the very simple form of apparatus in which I employ the carbon bi-sulphide. This apparatus, generally stated, consists in a series of tubes or other devices, in which the carbon bi-sulphide may be evaporated, I prefer to employ specially constructed devices in which the evaporation shall principally take place, which somewhat resembles ordinary radiators for heating purposes. It however is not necessary to employ them, a tube or pipe partly filled with the carbon bi-sulphide or fan like receptacles for it or any equivalent device may be used, but I will illustrate the said radiator like devices in the drawings hereof and describe them in this specification because they exhibit a good form of device for the purpose and for convenience I will call these devices "evaporators." They are located in such places as desired in the chamber to be refrigerated and are connected together by a pipe or air trunk, which runs to an exhaust fan or pump, whereby a vacuum more or less complete may be generated in the evaporators; I also supply pipes to convey the vapors or the re-liquefied vapors, as the case may be, from the device which creates the partial vacuum, whatever its form may be, back again to suitable receptacles or tanks in which the re-condensed bi-sulphide is collected for re-use. There are also small pipes connecting the said tanks with the evaporating pans in the lower part of the evaporators.

The above is a general statement of the apparatus, and all that is required to run it is sufficient power to operate the device which creates the vacuum, plus the replenishing of a small percentage of the carbon bi-sulphide wasted through evaporation. The care of the plant is ordinarily not so great as that required for a steam or hot water heating plant.

Figure 2:
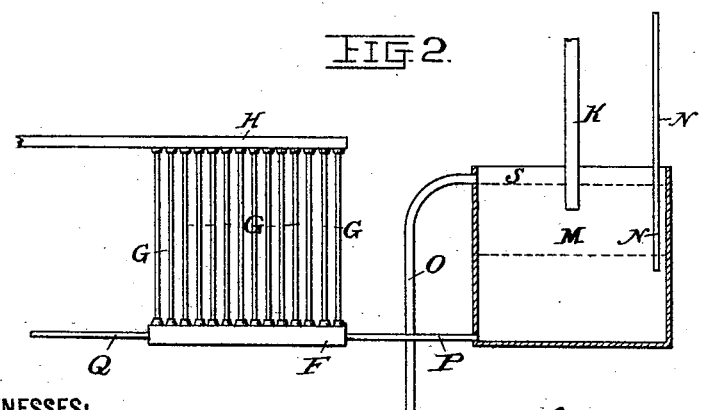

Referring to the drawings, Figure 1, is a vertical section of a refrigerator building or cold storage house, illustrating one arrangement of the devices constituting my apparatus. Fig. 2, illustrates an elevation of one construction and arrangement of one form of the condensing tank or reservoir and evaporator.

A, is the building; B, being the basement and C the roof thereof.

D, D, D, &c., are the several floors.

E, E, &c., are the evaporators. One form in which they may be made is seen at the left in Fig. 2, that is to say, F, is a pan or receiver, which may resemble the base of an ordinary radiator, that is to say, it is a closed metallic structure having a series of threaded openings in its upper surface, into which are threaded air tight a series of tubes G, G, &c., which may strongly resemble the vertical tubes of an ordinary radiator. At their upper ends, these tubes are all connected with a pipe H; the method of connection may be the same as that between the base F, and the tubes.

Although the vertical tubes G, may resemble the tubes of a radiator, they are not necessarily double as radiators ordinarily are. On the contrary, they may be single or double, and also they are each of them, as stated, connected with the pipe H, at their upper ends, which is not usually the case with radiator tubes.

Referring to Fig. 1, it will be seen that there may be a number of the evaporators, E, arranged along the wall or suspended from the ceiling, or otherwise located, in the chamber to be refrigerated and that they are all connected together by the pipe, H, which in the instance shown in the drawings, turns upwardly near the rear wall of the building and connects with an exhaust fan, I, located in the upper story. The pipe, H, opens into the lower end of a suction trunk, J, which opens at its upper end into the eye of the fan, I. K. is a pipe which connects with the delivery port L of the fan, and it runs at an incline toward the opposite side or front of the building, and thence descends through the several floors and enters the upper end of the condensing tank or reservoir, M.

Referring now again to Fig. 2, the tank, M, and the incoming tube, K, and co-acting parts are shown enlarged. N, is a water supply pipe, which may connect with any source of water supply. It opens within the reservoir, M. O, is an overflow pipe, which connects with any suitable drain, as for instance, the sewer in the street. P, is a pipe which may be quite small extending from near the bottom of the reservoir, M, to the bottom of the base F, of the evaporator. It opens into the interior thereof, and from the base, it, or one like it, marked Q, again extends into the base of the next adjoining evaporator, and from it, in turn, a similar pipe R, extends to the next evaporator of the series. It will thus be seen that all of the evaporators in the chamber or floor of the building, part of vessel, or other room or space, which is to be refrigerated, are connected at or near the upper ends of the vertical tubes, G, with a continuous pipe or conduit which extends to the fan; that there is then a return pipe for the vapors or re-liquefied vapors which is set at a downward inclination throughout its entire length and opens into the condensing reservoir, M, and that said reservoir is provided with a water supply pipe and an overflow pipe, and that from it extends a continuous supply pipe, P, Q, R, which connects the reservoir M, with each of the evaporators in turn and supplies the base or pan of each of them with the carbon bi-sulphide, it being in effect a continuous supply pipe for them.

I have illustrated and described the apparatus as placed in the first floor above the basement of the building shown in the drawings. It is to be understood that devices such as above described are placed in each of the floors of the building, or compartments or spaces in the vessel, brewery, &c., which are to be refrigerated. This is shown in the other floors of the building. Upon them however I do not put reference letters in order that the drawings may be simplified and confusion avoided. It will be noted that the apparatus in each of the floors has its own suction pipe, H, and its own return pipe K, water supply pipe N, reservoir, M, and other co-acting parts. This is not essential but I prefer to so arrange the devices, that if any derangement occurs in the apparatus in one floor, resulting from repairs, fire or other cause, the apparatus in other parts of the building may still continue in successful operation, and in order that the deranged section of the apparatus may be cut out, so to speak, from the system as a whole, I supply the necessary valves, cocks, and like devices, which however are not illustrated because they are too well known to require illustration or special description.

The operation of the apparatus as above described is as follows:—First: A quantity of carbon bi-sulphide, sufficient to fill each of the evaporating pans or bases of the evaporators upon each floor, and also sufficient to partially fill the tank, M, on each floor, say one-half full, is put into the apparatus on each floor, and it will be noted by reference to Fig. 2, that the over-flow pipe, O, from the tank, M, is located below the upper ends of the vertical pipes, G, of the evaporators. Consequently never under any circumstances can the carbon bi-sulphide, which is fed to the bases, F, by being placed in the tanks, M, and allowed to flow to them through the pipes, P, Q, R, reach a height sufficient to enter the pipes, H, because it will escape through the overflows O and into the sewer or other drain before it can do so. This will be seen by reference to the projected water level, S, shown in dotted lines in Fig. 2. It is well known that liquid carbon bi-sulphide will when subjected to a considerable vacuum, evaporate so rapidly as to lower the temperature to a very low point. Consequently as soon as the base pans and reservoir have been charged with carbon bi-sulphide, the fan or vacuum engine, I, is put in operation, which acting through the suction pipes or conduits, H, creates a partial vacuum in that pipe and also in the vertical tubes, G, of the evaporators, and in fact in all parts of the apparatus which are not filled with the carbon bi-sulphide, thereupon it immediately commences to evaporate with rapidity, the rapidity of its evaporization depending upon the degree of vacuum produced, and inasmuch as this material carbon bi-sulphide is exceedingly volatile even when under atmospheric pressure, its volatility is enormously increased by even slight reduction of atmospheric pressure, in other words, by even a slight vacuum. Consequently any desired degree of evaporization in other words cold, may be produced depending upon the rapidity with which the vacuum engine, in this case the fan, I, is run, which will of course result in the production of a greater or less vacuum. The vapors of the carbon bi-sulphide, as soon as they pass into the vacuum engine or fan, I, are subjected again to atmospheric pressure. In fact, in the fan itself they are subjected to somewhat more than ordinary atmospheric pressure, because of the crowding within the fan. Consequently they at once commence to reliquefy or condense, not materially however under ordinary circumstances, until they have passed into the return conduits or pipes, K; and since these conduits are placed at an inclination in the upper story of the building, the vapors as they condense will flow by gravity to the upper end of the vertical portion of the conduits, seen near the front wall of the building, down which they drop into the reservoirs, M, and the vapors which do not condense, if any, are blown along through the conduits K, until they enter the reservoirs and there they come in contact with the cold water supplied through the water pipes, N, by which they are at once condensed. The normal water level is maintained at S, there being a constant, although it may be a very small stream of water entering through the pipes, N, and escaping through the outlets, O, at all times; the volume of the water required will depend upon the temperature of the carbon bi-sulphide, it being desirable to keep it at as low a temperature as may be; and also upon the work done in the plant, as it is employed to deprive the recondensing vapors of their sensible heat, and at the same time afford a cover to the liquid carbon bi-sulphide, and protect it against evaporation in the air, while exposing the reservoirs to the pressure of the atmosphere. From the reservoirs, M, the carbon bi-sulphide flows again through the pipes, P, Q, and R, to the bases or evaporating pans of the evaporators.

The operation of the devices upon each of the floors of the building, or in each of the spaces to be refrigerated, as the case may be, is of course the same.

The details of construction and of arrangement of the various devices shown in the drawings, form no essential part of my invention. I show this construction and arrangement of the parts as an example only, or one form in which my invention may be constructed and arranged so far as the apparatus is concerned, and also one arrangement of apparatus by which the process may be practiced. Changes may be made in almost every feature or device illustrated without departing from the essentials. And as before stated it is not essential that there should be devices such as I have shown and described as the evaporator E, because a simple pipe of suitable size to contain the carbon bi-sulphide, with an air space above it, which may be exhausted, and a partial vacuum produced or any other such device may be employed.

It will be obvious to those who are familiar with this art, that my invention, both in its process and apparatus, is well adapted to the manufacture of artificial ice, that is to say, sets or groups of the evaporators, E, which may be modified in shape as desired, or other devices suitable for the purposes, may be placed within the brine tank, in which the vessel containing the water to be frozen will be submerged in the ordinary way, and when the invention is used for this purpose, it will be ordinarily desirable to make the conduits and all parts of the apparatus specially air tight, so that if desired a high degree of vacuum may be secured, which will result in intense cold and consequently more rapid freezing of the water in the molds. The apparatus as ordinarily used in cold storage houses and similar places, need not be absolutely air tight because slight leakage of the air, so long as it is not sufficient to materially affect the vacuum will not interfere with the successful operation of the apparatus; this fact illustrates one of the reasons why my apparatus is much less expensive in first construction, and also to maintain, than the apparatus employing ammonia in any form, because in them any leakage whatsoever in the apparatus is, first, a waste of material, and second a serious interference with the successful operation of the apparatus if not destructive of it. It will also be observed that the volatile liquid which I employ, i. e., bi-sulphide of carbon is of greater specific gravity than water and is insoluble in it, and also, that my reservoir is at the same time my condenser and that it is supplied with a continually renewed column or body of water, which comes cold from some outside source of supply. This arrangement of the parts results in the following advantages:

First. None of the cold generated by the machine is required for the condensation; on the contrary, it is supplied by the continually renewed cold water which costs practically nothing.

Second. I avail myself, not only of the low temperature of the water for the purposes of condensation, but also of the pressure exerted upon the vapors by the weight of the water column itself due to its height, and also the atmospheric pressure on the head of the water column, and of course to accomplish these results I use a volatile fluid which has greater specific gravity than water, and also which is not soluble in it. Consequently I also secure the sealing action of the water column, which naturally is superimposed over the condensed liquid, the vapors of which as they condense in direct contact with the water immediately precipitate.

I claim—

1. The combination in a refrigerating apparatus, of a reservoir containing the refrigerating material, receptacles for the said material, connected with the reservoir and in which the material may be exposed to the action of a vacuum, more or less perfect, a pipe connecting the said receptacle with the device which produces the vacuum, said vacuum-producing device, and an overflow for said reservoir located below the junction of said pipe with said receptacle, substantially as set forth.

2. The combination in a refrigerating apparatus of a combined condenser and reservoir adapted to contain the refrigerating material and a column of water a cold water supply pipe and an overflow pipe, receptacles for said material connected with the reservoir in which it may be subjected to a vacuum, a pipe connecting the said receptacle with the device which creates the vacuum, said pipe being constructed and arranged to draw the vapors from said receptacle, and connecting therewith on a higher level than the overflow from the reservoir and condenser and a return pipe connecting the device which creates the vacuum with the reservoir and condenser, substantially as set forth.

3. The combination in a refrigerating apparatus of a combined condenser and reservoir, adapted to contain the refrigerating material and a column of water, a receptacle for the said material connected with the lower part of the reservoir and condenser and in which the material may be subjected to the action of a vacuum, a pipe connecting said receptacle with the device which creates the vacuum, constructed and arranged to draw the vapors from said receptacle and an overflow from said reservoir and condenser to conduct away the overflow of the cooling water substantially as set forth.

4. The combination in a refrigerating apparatus of a combined condenser and reservoir adapted to contain the refrigerating material and a column of cold water comprising essentially a conduit or pipe for conveying the refrigerating material into it, a pipe connected with an outside source of water supply, an overflow pipe to conduct away the overflow of the cooling water opening into the reservoir above the mouth of the conduit or pipe through which the refrigerating material enters the reservoir and a pipe connecting with the bottom of the reservoir and condenser for conveying the condensed refrigerant to the place of its use, substantially as set forth.

5. The combination in a refrigerating apparatus of a reservoir containing the refrigerating material, receptacles for the said material connected with the reservoir, in which the material may be exposed to the action of a vacuum more or less perfect, a pipe conecting said receptacle with the device which produces the vacuum and said vacuum producing device, substantially as set forth.

Signed at New York, in the county of New York and State of New York, this 15th day of November, A. D. 1892.

MARTIN WANNER.

Witnesses:
PHILLIPS ABBOTT,
M. L. FERRES.